(12) United States Patent
Salter et al.

(10) Patent No.: US 12,275,351 B2
(45) Date of Patent: Apr. 15, 2025

(54) ACOUSTIC VEHICLE ALERTING SYSTEM (71) Applicant: FORD GLOBAL TECHNOLOGIES, LLC, Dearborn, MI (US)

(72) Inventors: Stuart C. Salter, White Lake, MI (US); Jeffrey R. Seaman, Petersburg, MI (US); Ralph R. Jones, Tecumseh (CA); Brendan F. Diamond, Grosse Pointe, MI (US); Joseph W. Herman, Ferndale, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 117 days.

(21) Appl. No.: 18/239,809

(22) Filed: Aug. 30, 2023

(65) Prior Publication Data

US 2025/0074304 A1    Mar. 6, 2025

(51) Int. Cl.
*B60Q 5/00* (2006.01)
*G10K 11/178* (2006.01)

(52) U.S. Cl.
CPC ........ *B60Q 5/006* (2013.01); *G10K 11/17823* (2018.01); *G10K 2210/1282* (2013.01)

(58) Field of Classification Search
CPC ............. B60Q 5/006; G10K 11/17823; G10K 2210/1282
USPC ...................................................... 340/435
See application file for complete search history.

(56) References Cited

U.S. PATENT DOCUMENTS

| | | | | |
|---|---|---|---|---|
| 6,360,187 | B1* | 3/2002 | Hermann | H03G 3/32 |
| | | | | 702/191 |
| 8,537,030 | B2* | 9/2013 | Perkins | G08G 1/166 |
| | | | | 340/474 |
| 9,189,452 | B2 | 11/2015 | Hahne | |
| 9,718,405 | B1* | 8/2017 | Englander | B60R 1/008 |
| 9,873,375 | B2 | 1/2018 | Matsubara et al. | |
| 10,000,152 | B1* | 6/2018 | Scalea | B60Q 5/006 |
| 10,207,639 | B2* | 2/2019 | Scalea | G08B 3/10 |
| 10,347,121 | B2 | 7/2019 | MacNeille et al. | |
| 10,525,876 | B2* | 1/2020 | Scalea | B60Q 9/008 |
| 11,059,420 | B2 | 7/2021 | Pyzik et al. | |
| 11,317,204 | B2* | 4/2022 | Pan | H04R 3/12 |
| 2009/0066499 | A1* | 3/2009 | Bai | G10K 15/02 |
| | | | | 340/459 |
| 2011/0199199 | A1* | 8/2011 | Perkins | B60Q 1/525 |
| | | | | 340/435 |
| 2012/0299717 | A1 | 11/2012 | Yoshino et al. | |
| 2014/0240118 | A1* | 8/2014 | Lee | B60Q 5/008 |
| | | | | 340/463 |

(Continued)

FOREIGN PATENT DOCUMENTS

EP    3199403 B1    6/2022
WO    2023016986 A1    2/2023

*Primary Examiner* — Zhen Y Wu
(74) *Attorney, Agent, or Firm* — Frank L. Lollo; MacMillan, Sobanski & Todd, LLC (57) ABSTRACT

A pedestrian alerting system adapts alerting sounds emitted by a vehicle according to an acoustic environment around the vehicle. Echoes of the alerting sound in an enclosed space such as a garage can be irritating to the pedestrians and/or occupants of the vehicle. A sensor suite including radar, cameras, and/or a GPS locator detect confined spaces in which reflections result in a greater apparent loudness. Emitted loudness of the alerting sounds are reduced, wherein the reduction of the volume may be based on the size of the space.

20 Claims, 5 Drawing Sheets

(56) References Cited

U.S. PATENT DOCUMENTS

| | | | |
|---|---|---|---|
| 2015/0035660 A1* | 2/2015 | Sakakibara | B60Q 5/008 340/425.5 |
| 2015/0127191 A1* | 5/2015 | Misra | G08G 1/056 701/1 |
| 2017/0096099 A1* | 4/2017 | Matsubara | G10K 11/17855 |
| 2017/0132893 A1* | 5/2017 | Grenn | G08B 3/10 |
| 2018/0118106 A1* | 5/2018 | You | G08G 1/005 |
| 2018/0164106 A1* | 6/2018 | Peterson | G01C 21/3617 |
| 2018/0293812 A1 | 10/2018 | Miller et al. | |
| 2019/0001881 A1* | 1/2019 | You | B60Q 5/008 |
| 2019/0184896 A1* | 6/2019 | Scalea | G08G 1/162 |
| 2021/0001770 A1* | 1/2021 | Kim | G10K 15/02 |
| 2021/0146832 A1* | 5/2021 | Scalea | G08G 1/162 |
| 2021/0197807 A1* | 7/2021 | Park | B60W 40/105 |
| 2021/0402920 A1 | 12/2021 | Pyzik et al. | |

\* cited by examiner

ACOUSTIC VEHICLE ALERTING SYSTEM

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to pedestrian alert systems, and, more specifically, to adapting alerting sounds emitted by a vehicle according to an acoustic environment around the vehicle.

Electric motors in electric vehicles are very quiet compared to combustion engines in traditional fuel-based vehicles. Additionally, as exhaust systems of the traditional vehicles improve and idle stop-start systems become more widespread, fuel-based vehicles are also becoming quieter. Pedestrians located near a quiet vehicle may be less likely to notice a vehicle moving in their direction.

Pedestrians use noise emitted by a vehicle to help make judgments in areas where vehicles and people are in close proximity (e.g., crosswalks, parking lots, narrow streets, etc.). Audible noise may provide cues for detecting when a car is moving and for judging its relative position. When audible noise is diminished, it may be more burdensome to judge the movement and the relative position of quiet vehicles, even if the vehicle is actually moving. Consequently, various governments (e.g., city, county, perish, state, province, prefecture, country, etc.) may impose requirements for vehicles to emit a minimum amount of noise which is perceptible by the pedestrians. For example, the National Highway Traffic Safety Administration is developing a standard for a minimum level of noise (see, for example, NHTSA-2011-0148 and 49 C.F.R. § 571) to be emitted by road vehicles based in part on a standard (SAE J2889) developed by the Society of Automotive Engineers to measure a minimum level of noise emitted by a road vehicle.

According to various regulations and standards, an alert sound should be generated with a loudness in the range of 56 to 75 decibels (measured at a fixed distance). The alert sound may be allowed to change in frequency and/or loudness. The shift may be linked to speed of the vehicle, for example. Different sounds (e.g., characteristic sound samples or tones) may be emitted in different directions. Activation of alert sounds may be required in a particular driving state which may be defined as (A) remaining stationary with a transmission selector in neutral, reverse, or a forward gear (B) rearward motion, or (C) forward motion at a speed less than a forward cutoff speed. Above the cutoff speed, alerting sounds may become unnecessary because wind and tire noise is sufficient to make the vehicle detectable.

When deliberately emitting alerting sounds for informing pedestrians (i.e., anyone near a vehicle) about a moving vehicle, it may be desirable to tailor the acoustic properties of the sounds, such as loudness (i.e., audio volume), to ensure they are perceived by the pedestrian. On the other hand, excessive loudness may be uncomfortable to the pedestrian or to occupants of the vehicle, and should be avoided. Furthermore, noise pollution ordinances may impose limits on maximum noise levels.

SUMMARY OF THE INVENTION

In one aspect of the invention, a vehicle comprises a sound transducer for projecting alerting sounds outside the vehicle. A sensor suite is configured for (1) detecting a pedestrian within a predetermined proximity of the vehicle when the vehicle is in a driving state and (2) determining whether the vehicle is located in a walled enclosure. A controller is configured to (A) select an audio sample to be projected for an alerting event occurring when the pedestrian is detected within the predetermined proximity while the vehicle is in the driving state, and (B) determine acoustic parameters with which the alerting sounds are generated. The acoustic parameters include a first component comprising a first loudness based on a target apparent loudness to be manifested at the pedestrian and a second component comprising a corresponding curtailment of the alerting sounds when the vehicle is determined to be in the walled enclosure. An audio controller drives the sound transducer according to the audio sample and the acoustic parameters.

DETAILED DESCRIPTION OF PREFERRED EMBODIMENTS

In some embodiments of the invention, an acoustic vehicle alerting system employs an exterior sensor suite and other resources for determining vehicle operating conditions, ambient environmental loudness, and other relevant inputs to control the sound and/or tone of a vehicle exterior sound generator (e.g., loudspeaker) to ensure pedestrians are alerted of the vehicle's presence with minimal annoyance. Monitored operating conditions of the vehicle and environment can include vehicle speed, drive gear (reverse/drive), current ambient sound level picked up by exterior transducers, speed limit, GPS location, type of vehicle being driven (e.g., truck, car, and any attached trailer). Using the current vehicle location, the vehicle can determine the associated sound ordinances for the current region. The exterior loudness will be controlled to be at least as loud as needed by regulations. Furthermore, the loudness is set to be at least a predetermined loudness level (e.g., measured in dB and calibrated during vehicle development) above the ambient environment (not to exceed either the maximum of the regulatory range or a level provided by local sound ordinance.

An exterior sensor suite may include radar, cameras, LIDAR, and/or other remote sensing technologies to quantify loudness of ambient noises, the distance to and orientation of pedestrians and the roadway, and movement of pedestrians, the vehicle, and other obstacles.

The locations of objects, people, and other living beings may be mapped around the vehicle. The distance of the vehicle to each may be estimated. If a pedestrian (i.e., person or living being) is moving, then a trajectory analysis may be performed to determine if the pedestrian is headed into or near the path of the moving vehicle. Based on the proximity or trajectory, the vehicle may increase the exterior sound by a calibrated gain (up to the maximum allowable volume). The directionality of the alerting sounds can be steered toward where pedestrians are located, e.g., by driving the speaker/sound exciter closest to the pedestrian to become louder while other speakers can stay at their normal volumes.

Echoes (i.e., reflections) of the alerting sound in an enclosed space such as a garage can be irritating to the pedestrians and/or occupants of the vehicle. The sensor suite (e.g., radars, cameras, or GPS locator) can be used to detect confined spaces in which reflections result in a greater apparent loudness, so that the emitted loudness of the alerting sounds can be reduced. A reduction of the volume may be based on the size of the space. The size of the reduction may be limited to in order to maintain compliance with a legal minimum loudness levels.

Based on how close the vehicle and/or pedestrian is located to the walls and how open the enclosed space is, the loudness reduction may be comprised of a calibrated gain wherein more confined spaces (walls closer together) are generated with a proportionally lower volume. Additionally, or alternatively, the vehicle can alter the alerting sounds to have higher frequency content which can prevent the sound waves from travelling as far.

Based on the type of vehicle and whether the vehicle is towing a trailer, a completely different sound type or tone (e.g., recorded sound sample) can be generated to indicate vehicle size (e.g., a truck can have a lower frequency sound, or a larger loudness boost above the ambient loudness could be used to indicate a trailer). Sound emitters can also be installed on the trailer to help ensure that its presence is heard even after the vehicle passes.

Figure 1:
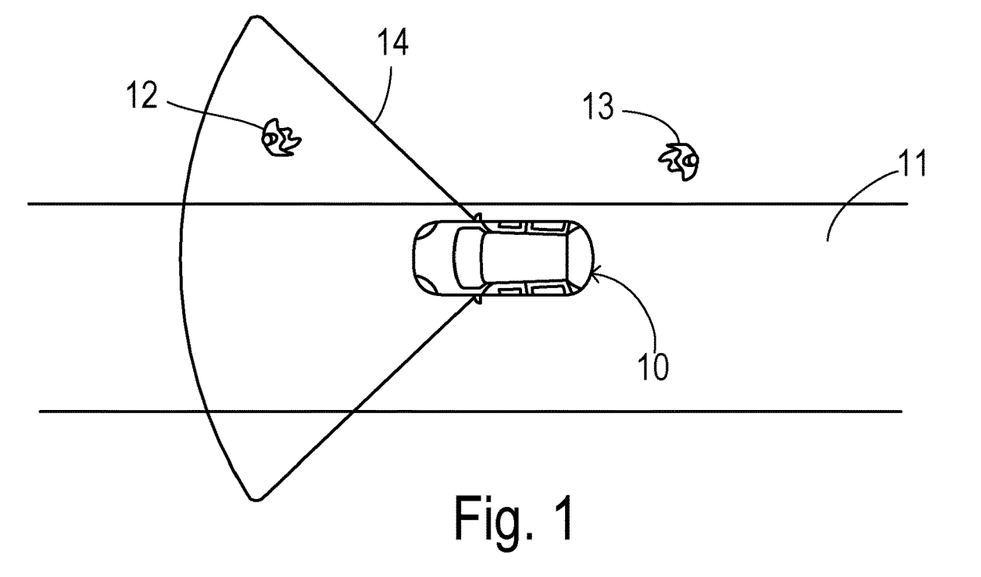
FIG. 1 is a schematic diagram showing a vehicle in a driving state detecting nearby pedestrians.

Referring to FIG. 1, a vehicle 10 is situated on a surface 11 (e.g., a road or parking area) with pedestrians 12 and 13 in the vicinity. Sensors in vehicle 10 may provide various monitoring zones such as a monitoring zone 14 which covers pedestrian 12. Depending on the driving state of vehicle 10 and the proximity/movement of pedestrians 12 or 13, alerting sounds may be automatically generated by vehicle 10 to be heard in a way that makes the presence and potential movements of vehicle 10 easily perceivable.

Figure 2:
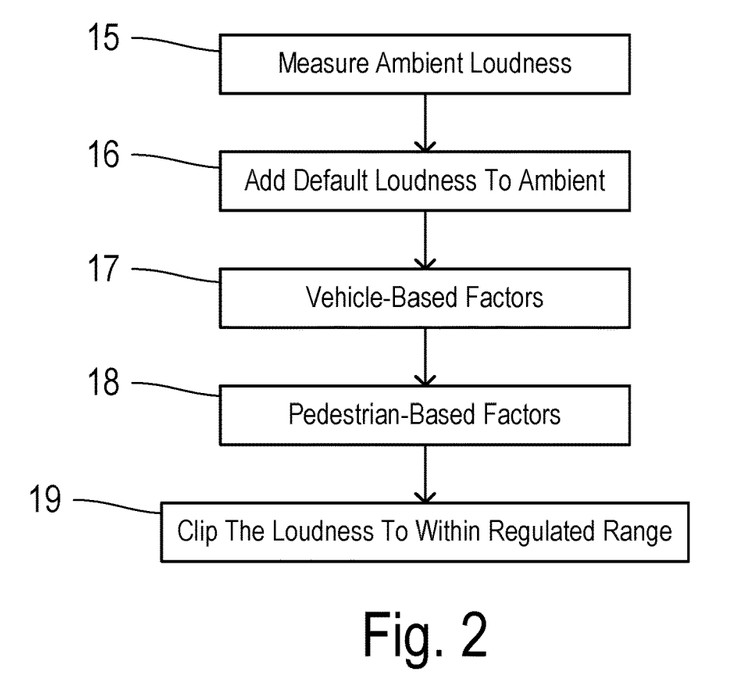
FIG. 2 is a flowchart showing a method for adapting alerting sounds to be reproduced outside a vehicle as an alert to pedestrians.

FIG. 2 shows one preferred method of adapting alerting sounds to particular circumstances. In step 15, an ambient loudness level is measured. An external microphone or other acoustic transducer may be used to sense ambient noise around the vehicle, which may be measured in dB. To this base sound level, a default loudness for the alerting sounds is added in step 16. The default loudness provides a buffer above the ambient level to ensure that the alerting sounds are not masked by existing noises. The default loudness may be about 20 dB, for example.

Additional adjustments may be made to the acoustic parameters (e.g., loudness and/or content of the alerting sounds) for improved utility. In step 17, various vehicle-based factors are employed. For example, a vehicle speed adjustment may be comprised of a loudness boost which is proportional to speed, and a trailer adjustment may be comprised of a loudness boost when a trailer is present (e.g., +5 dB) or a lowering of the frequency spectrum of an alerting tone. In step 18, various pedestrian-based factors are employed. For example, a distance adjustment may be comprised of a loudness decrement with is proportional to the distance between the pedestrian and the vehicle (e.g., −3 dB at 20 feet).

In step 19, the adjusted acoustic parameters (e.g., adjusted loudness) is compared with, and clipped according to, regulated parameters. For example, a regulated loudness range may have a minimum of 56 dB and a maximum of 75 dB. If an adjusted loudness is less than 56 dB then the acoustic parameter for generating the alerting sounds is increased to 56 dB, and if an adjusted loudness is more than 75 dB then the acoustic parameter for generating the alerting sounds is decreased to 75 dB. A local sound ordinance may also impose an upper limit which may also require clipping of a target loudness for the alerting sounds. Thus, the acoustic parameters are determined which include an adjusted loudness. That loudness is compared with a regulated loudness range comprising a minimum loudness and a maximum loudness. If the determined loudness is less than the minimum loudness then it is further adjusted to equal the minimum loudness, and if it is greater than the maximum loudness then it is further adjusted to equal the maximum loudness.

Figure 3:
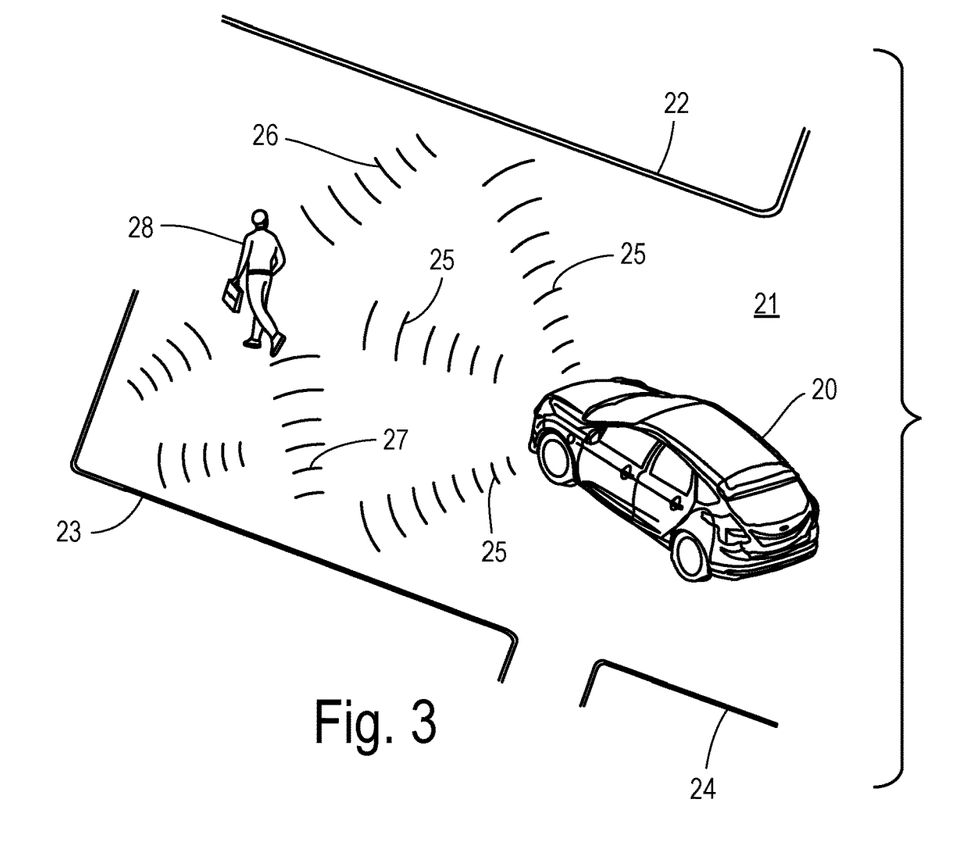
FIG. 3 is a schematic diagram showing a vehicle and pedestrian located in a walled enclosure such as a parking garage.

FIG. 3 illustrates how confined spaces may produce reflections which result in a greater apparent loudness (a situation which can be addressed in the invention by reducing the emitted loudness of the alerting sounds). A vehicle 20 is located in an enclosure 21 such as a parking structure having walls 22, 23, and 24 (in addition to a floor and ceiling) which enclose vehicle 20 within a chamber capable of restricting propagation of sounds. Alerting sounds 25 emitted from vehicle 20 encounter walls 22 and 23 to generate reflections 26 and 27, respectively, which encounter a pedestrian 28 whose presence invoked the generation of the alerting sounds. Both direct sounds 25 and reflected sounds 26 and 27 (among others) converge on pedestrian 28, which may result in an unpleasant experience of the alerting sounds including enhanced loudness and/or annoying echoes or interferences.

Figure 4:
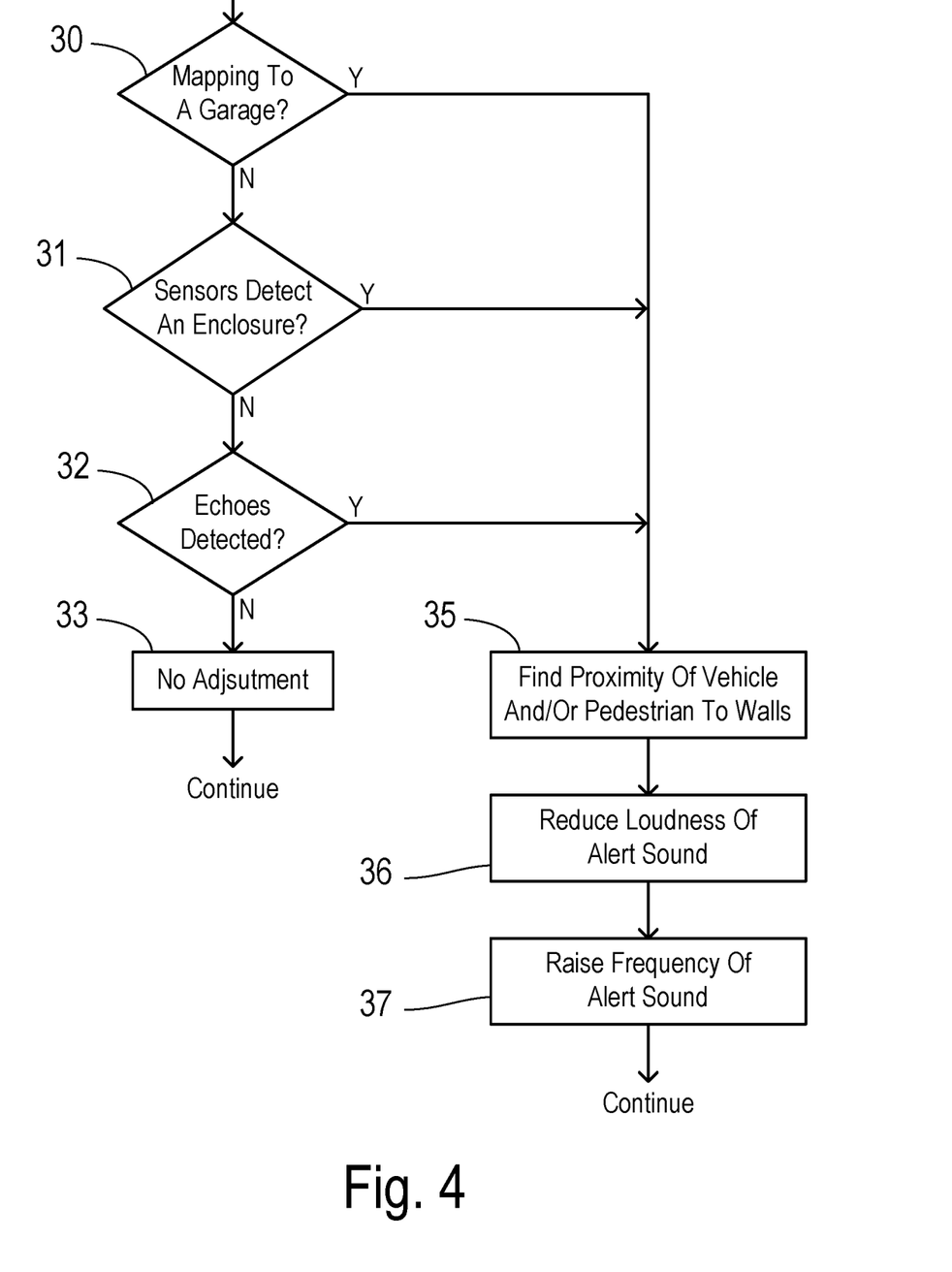
FIG. 4 is a flowchart showing one preferred method of the invention.

Unpleasantness of the alerting sounds can be reduced by the invention according to a method shown in FIG. 4. A check is performed in step 30 to determine whether geographic location coordinates of the vehicle map to a garage or other enclosure, using a map defining known locations of enclosures such as garages or parking structures. If the vehicle is determined to be located in such a garage, then corrective action may be initiated at a step 35. If the geographic location is not mapped to a garage, then other mechanisms can be employed to determine whether the vehicle is located in a walled enclosure. Thus, a check is performed in step 31 using a suite of sensors located on the vehicle to determine whether an enclosure is detected. For example, camera images can be analyzed, or radar reflections can be monitored in an attempt to characterize a walled enclosure. If a walled enclosure is detected then again, the method proceeds to step 35, otherwise another check can be performed in step 32 to determine whether echoes indicative of reflective walls are detected in the acoustic environment around the vehicle. For example, an external sound (e.g. chirp) can be generated and then a microphone signal can be monitored to recognize any immediate and strong echoes of the generated sound. If no echoes are detected, then no walled enclosure is detected. Consequently, it is determined that no adjustment is needed at step 33, and the method may continue as in FIG. 2.

When the vehicle is determined to be located in a walled enclosure by step 30, 31, or 32, then a proximity of the vehicle and/or the pedestrian to the walls of the enclosure may be determined in step 35. The proximity to one or more walls can be an indication of the magnitude of reflections which need to be addressed. In step 36, the target loudness of the alerting sound (e.g., as determined in steps 15 to 18 of FIG. 2) is reduced. The amount of the reduction may be proportional to a distance of the vehicle from a wall or a distance of the pedestrian from a wall of the enclosure. The wall distance may be determined according to whichever wall is positioned to generate a strong reflection. In addition to or as an alternate to the reduction of loudness used for generating the alerting sounds, the unpleasantness experienced by the pedestrian can also be reduced by optionally raising a frequency of the alerting sound (since human hearing is less sensitive to sounds at higher frequencies). Thus, the frequency of the alerting sound may be raised in step 37 and then the method continues normally.

Figure 5:
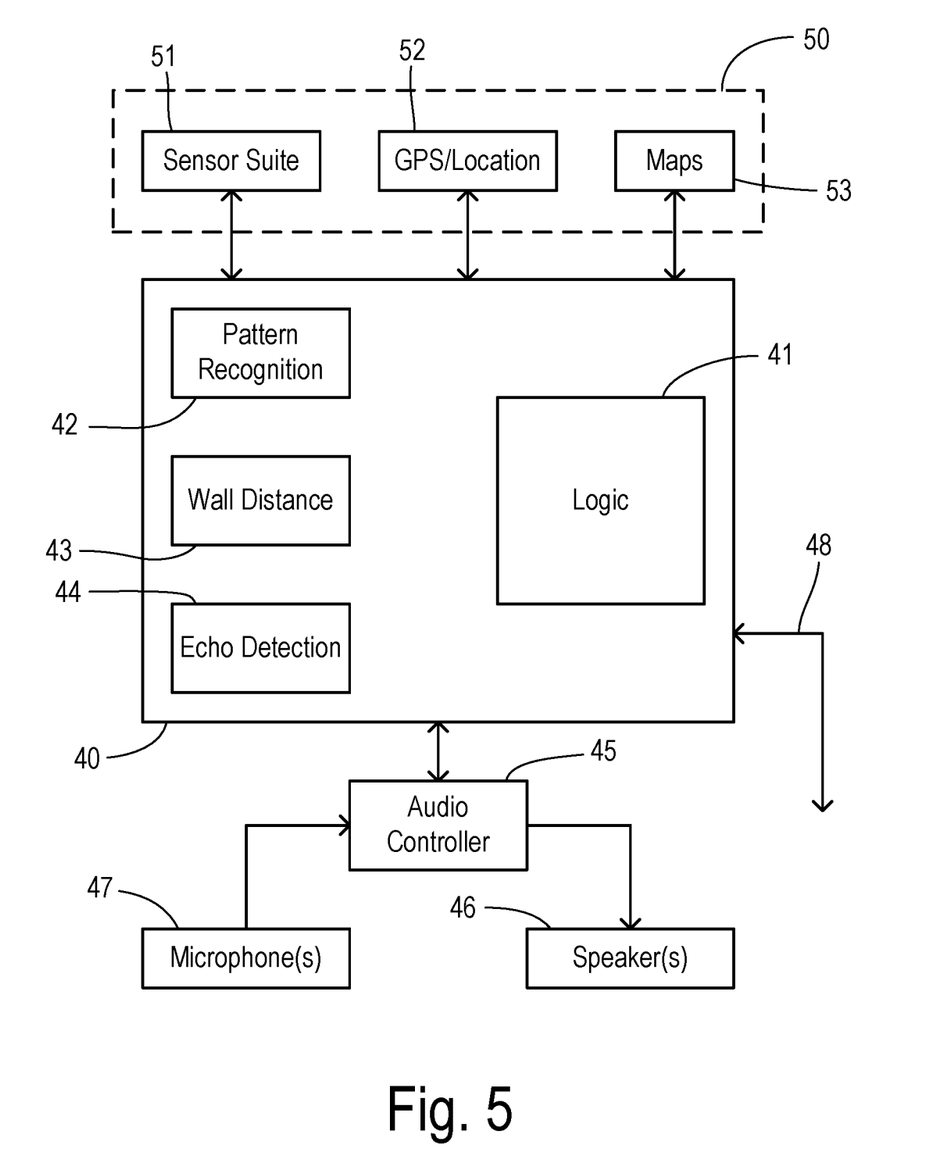
FIG. 5 is a block diagram showing an embodiment of a vehicle according to the present invention.

FIG. 5 is a block diagram showing a vehicle in greater detail. A main controller 40 such as a microcontroller includes a main logic block 41 (e.g., programming instructions) for operating the present invention. The programming further includes a pattern recognition block 42, a wall distance determination block 43, and an echo detection block 44. An audio controller 45 is coupled to controller 41 and is connected to loudspeakers 46 and to one or more microphones 47. Speakers 46 generate the alerting sounds, and microphones 47 may pick up external sounds such as ambient noise levels and generated echoes. Controller 40 is coupled to a plurality of inputs 50 including an eternal sensor suite 51, a GPS/location unit 52, and a map database 53. Sensor suite 51 may preferably be comprised of known advanced driver assistance sensors such as image sensors, radar, lidar, ultrasonic sensors, and others for detecting a pedestrian within a predetermined proximity of the vehicle and for locating walls defining the walled enclosure. Controller 40 is further coupled with a multiplex communication bus 48 which connects to other electronic controllers in the vehicle such as a powertrain controller in order to monitor a driving state of the vehicle. For example, signals may be received over bus 48 indicating a gear selector position and/or a vehicle speed which may be used to determine when alerting sounds are needed.

Unit 52 may include a GPS receiver or other wireless receiver such as a Wi-Fi transceiver capable of determining location coordinates. Map database 53 identifies locations of a plurality of walled enclosures, and logic block 41 is configured to compare location coordinates obtained by unit 52 with map database 53 to detect instances where the vehicle is located in a walled enclosure. Alternately or additionally, logic 41 may utilize captured images or other sensed data from sensor suite 51 for analysis by pattern recognition unit 42 to recognize a walled enclosure. Logic block 41 uses a wall distance block 43 to compare the relative locations of the vehicle, pedestrian, and walls to estimate the distances and orientations so that the impact of echoes and reflections on perception of the alerting sounds can be characterized. When the location coordinates or sensor suite pattern recognition processes fail to detect a walled enclosure, logic unit 41 may check for reflective walls using echo detection. Echo detection block 44 compares emitted and received sounds which may identify the timing and strength of reflections. When a walled enclosure is detected according to any of the foregoing methods, logic block 41 may select an audio sample to be projected for an alerting event in response to a pedestrian being detected within a predetermined proximity of the vehicle while the vehicle is in a driving state (e.g., in-gear or moving). Logic block 41 is further configured to determine acoustic parameters with which the alerting sounds are to be generated wherein the acoustic parameters include a first component comprising a first loudness based on a target apparent loudness to be manifested at the pedestrian and a second component comprised of a corresponding curtailment of the alerting sounds when the vehicle is determined to be in the walled enclosure. Preferably, the curtailment provided by the second component may be comprised of a loudness reduction. The curtailment may be comprised of an increase in the frequency spectrum of the selected audio sample. As used herein, audio sample includes a tone, a combination of tones, a recorded sound file, or other audio content. The curtailment (i.e., the increase in frequency and/or the decrease in loudness) may be determined according to the distance between a wall of the enclosure and the vehicle or the pedestrian.

Figure 6:
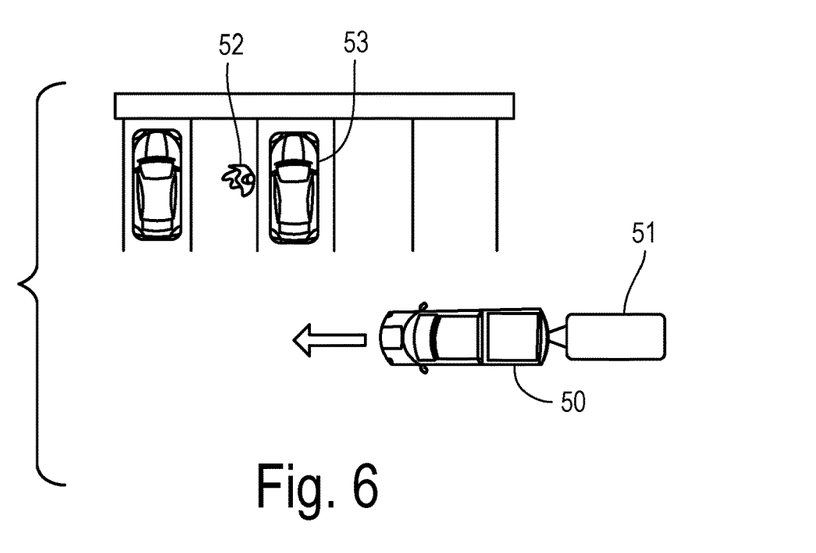
FIG. 6 is a schematic diagram showing a vehicle towing a trailer and moving past a pedestrian.

FIG. 6 illustrates a further situation wherein a vehicle 50 is towing a trailer 51 thereby increasing the overall length of the unit which may interact with pedestrians. A pedestrian 52 is within the predetermined proximity for generating alerting sounds. Further, pedestrian 52 may be in a position which makes it harder to sense the vehicle and its trailer due to an intervening parked vehicle 53. Therefore, it may be desirable to alter the alerting sounds to inform pedestrian 52 of the unique situation involving a trailer.

Sensor suite 51 and logic block 41 may be configured to detect presence of a trailer attached to the vehicle. The presence of a trailer may be indicated from another electronic module in the vehicle over the multiplex bus. When a trailer is detected, the adjustable acoustic parameters for generating the alerting sounds may include a third component comprising an enhancement of the alerting sounds when the attached trailer is detected. The enhancement may be comprised of a loudness boost or may be comprised of a unique type of sound such as a unique tone or combination of tones for identifying presence of the trailer.

Figure 7:
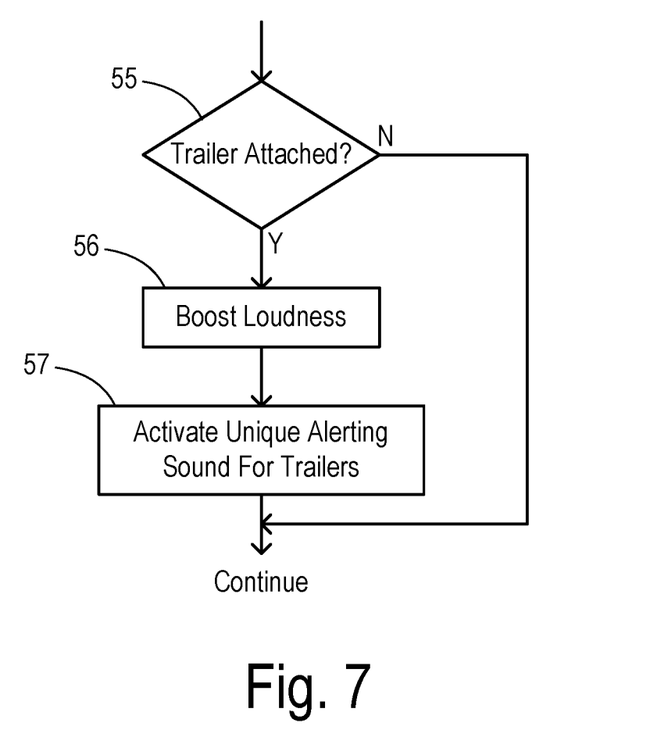
FIG. 7 is a flowchart showing an embodiment of the invention providing alerting sounds when a trailer is attached to the vehicle.

FIG. 7 shows a corresponding method wherein a check is performed in step 55 to determine whether a trailer is attached to the vehicle. If not, then the alerting sounds are unaffected and the method continues according to the previous figures. When a trailer is detected, then a loudness boost (e.g., +5 dB) is determined in step 56 which is applied to the alerting sounds as appropriate. In step 57, a unique alerting sound may be activated which identifies the presence of a trailer. For example, a frequency or frequency spectrum of the alerting sounds may be lowered.

What is claimed is:

1. A vehicle comprising:
   a sound transducer for projecting alerting sounds outside the vehicle;
   a sensor suite configured for (1) detecting a pedestrian within a predetermined proximity of the vehicle when the vehicle is in a driving state, and (2) determining whether the vehicle is located in a walled enclosure;
   a controller configured to (A) select an audio sample to be projected for an alerting event occurring when the pedestrian is detected within the predetermined proximity while the vehicle is in the driving state, and (B) determine acoustic parameters with which the alerting sounds are generated, wherein the acoustic parameters include a first component comprising a first loudness based on a target apparent loudness to be manifested at the pedestrian, and a second component comprising a corresponding curtailment of the alerting sounds when the vehicle is determined to be in the walled enclosure; and an audio controller driving the sound transducer according to the audio sample and the acoustic parameters.

2. The vehicle of claim 1 wherein the second component is comprised of a loudness reduction included in the acoustic parameters.

3. The vehicle of claim 2 wherein the controller is further configured to determine a distance of a wall of the enclosure from the vehicle or from the pedestrian, and wherein the loudness reduction is determined according to the distance.

4. The vehicle of claim 1 wherein the second component is comprised of an increase of a frequency spectrum of the audio sample.

5. The vehicle of claim 4 wherein the controller is further configured to determine a distance of a wall of the enclosure from the vehicle or from the pedestrian, and wherein the increase of the frequency spectrum is determined according to the distance.

6. The vehicle of claim 1 wherein the sensor suite comprises a wireless receiver determining location coordinates, and wherein the controller compares the location coordinates to a map database identifying a plurality of walled enclosures at respective locations.

7. The vehicle of claim 1 wherein the sensor suite comprises advanced driver assistance sensors for locating walls defining the walled enclosure.

8. The vehicle of claim 1 wherein the sensor suite is further configured to detect presence of a trailer attached to the vehicle, and wherein the acoustic parameters include a third component comprising an enhancement of the alerting sounds when the attached trailer is detected.

9. The vehicle of claim 8 wherein the enhancement is comprised of a loudness boost.

10. The vehicle of claim 8 wherein the enhancement is comprised of a unique sound type for identifying the trailer.

11. The vehicle of claim 1 wherein the determined acoustic parameters include a determined loudness, wherein the controller is further configured to compare the determined loudness with a regulated loudness range comprising a minimum loudness and a maximum loudness, wherein if the determined loudness is less than the minimum loudness then the controller adjusts the determined loudness to equal the minimum loudness, and wherein if the determined loudness is greater than the maximum loudness then the controller adjusts the determined loudness to equal the maximum loudness.

12. A method of alerting a pedestrian of the presence of a vehicle in a driving state, comprising the steps of:

detecting a pedestrian within a predetermined proximity of the vehicle when the vehicle is in a driving state;

determining whether the vehicle is located in a walled enclosure;

selecting an audio sample to be projected for an alerting event occurring when the pedestrian is detected within the predetermined proximity while the vehicle is in the driving state;

determining acoustic parameters with which the alerting sounds are generated, wherein the acoustic parameters include a first component comprising a first loudness based on a target apparent loudness to be manifested at the pedestrian, and a second component comprising a corresponding curtailment of the alerting sounds when the vehicle is determined to be in the walled enclosure.

13. The method of claim 12 wherein the second component is comprised of a loudness reduction included in the acoustic parameters.

14. The method of claim 13 further comprising the step of:

determining a distance of a wall of the enclosure from the vehicle or from the pedestrian;

wherein the loudness reduction is determined according to the distance.

15. The method of claim 12 wherein the second component is comprised of an increase of a frequency spectrum of the audio sample.

16. The method of claim 15 further comprising the step of:

determining a distance of a wall of the enclosure from the vehicle or from the pedestrian;

wherein the increase of the frequency spectrum is determined according to the distance.

17. The method of claim 12 wherein the step of determining whether the vehicle is located in a walled enclosure is comprised of a wireless receiver determining location coordinates, wherein the location coordinates are compared to a map database identifying a plurality of walled enclosures at respective locations.

18. The method of claim 12 wherein the step of determining whether the vehicle is located in a walled enclosure is comprised of locating walls defining the walled enclosure using advanced driver assistance sensors.

19. The method of claim 12 further comprising the step of:

detecting presence of a trailer attached to the vehicle;

wherein the acoustic parameters include a third component comprising an enhancement of the alerting sounds when the attached trailer is detected.

20. The method of claim 19 wherein the enhancement is comprised of a loudness boost or a unique sound type for identifying the trailer.

* * * * *